(12) United States Patent
Banghard et al.

(10) Patent No.: US 7,129,430 B2
(45) Date of Patent: Oct. 31, 2006

(54) LOW-VOLTAGE CIRCUIT BREAKER

(75) Inventors: Johannes-Gerhard Banghard, Friedrichsthal (DE); Joerg Baumgaertl, Berlin (DE); Stefan Losch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 10/845,064

(22) Filed: May 14, 2004

(65) Prior Publication Data

US 2004/0262134 A1 Dec. 30, 2004

(30) Foreign Application Priority Data

May 16, 2003 (DE) ................................. 103 23 095

(51) Int. Cl.
*H01H 9/20* (2006.01)
(52) U.S. Cl. .................................. 200/50.21; 200/50.24
(58) Field of Classification Search .. 200/50.21–50.26; 361/605–610, 615
See application file for complete search history.

(56) References Cited

U.S. PATENT DOCUMENTS

| | | | |
|---|---|---|---|
| 3,784,764 A * | 1/1974 | Wilson | 200/50.24 |
| 5,200,585 A * | 4/1993 | Davies et al. | 200/50.22 |
| 6,177,641 B1 * | 1/2001 | Morel et al. | 200/50.26 |
| 6,184,483 B1 * | 2/2001 | Coudert et al. | 200/50.21 |
| 6,472,620 B1 * | 10/2002 | Rane et al. | 200/50.26 |
| 6,545,234 B1 * | 4/2003 | Trivette et al. | 200/50.21 |
| 6,838,626 B1 * | 1/2005 | Deylitz et al. | 200/50.21 |
| 6,864,444 B1 * | 3/2005 | Anger et al. | 200/50.21 |

FOREIGN PATENT DOCUMENTS

| | | |
|---|---|---|
| DE | 100 10 727 C2 | 3/2002 |
| DE | 100 65 090 C1 | 3/2002 |
| DE | 101 20 783 C1 | 11/2002 |
| DE | 101 53 108 C1 | 11/2003 |
| EP | 0 048 042 A2 | 3/1982 |

* cited by examiner

*Primary Examiner*—Michael A. Friedhofer
(74) *Attorney, Agent, or Firm*—Harness, Dickey & Pierce, P.L.C.

(57) ABSTRACT

A low-voltage circuit breaker includes at least one switching-on catch for initiating a switching-on process, and at least one insertion mechanism, which has an insertion shaft, for insertion of the circuit breaker into the withdrawable frame, or for removal of the circuit breaker from the withdrawable frame. The low-voltage circuit breaker further includes at least one power-transmitting system, connected to the insertion shaft, and connectable to the switching-on catch such that the switching-on catch can be moved to an activated state from a deactivated state at a defined unloading position of the movement, and can be moved to a deactivated state from an activated state at a defined reset position in the movement.

29 Claims, 7 Drawing Sheets

LOW-VOLTAGE CIRCUIT BREAKER

The present application hereby claims priority under 35 U.S.C. §119 on German patent application number DE 103 23 095.5 filed May 16, 2003, the entire contents of which are hereby incorporated herein by reference.

FIELD OF THE INVENTION

The invention generally relates to a low-voltage circuit breaker based on withdrawable technology.

BACKGROUND OF THE INVENTION

For safety at work reasons, a circuit breaker which has been manufactured in accordance with the ANSI Standard, must, for removal from the switchgear assembly for example for maintenance purposes, have an unloaded energy store (generally a spring store) for the switching mechanism. To achieve this, it is necessary for the storage spring of the switching mechanism to be automatically unloaded during the removal process (EP 0 048 042).

To do this, it is known for the storage spring of the switching mechanism to be unloaded by way of a switching process which unloads the spring store at a defined point in the movement (the so-called unloading position) as a function of the crank revolutions of the movement drive. This unloading is carried out by low-load switching.

During the movement of the circuit breaker from its operating position to the unloading position, and/or to the removal position, the switching-off catch is activated intrinsically by its design for safety reasons. This switching-off catch is provided in order to initiate a switching-off process for the low-voltage circuit breaker.

In consequence, at the unloading position during the movement, the activation of the switching-on catch, which is provided in order to initiate a switching-on process, leads to low-load switching when the spring is loaded. In this case, the spring store is unloaded (DE 101 53 108 C1 and DE 100 65 090 C1), without the main contacts of the low-voltage circuit breaker closing. The interaction of the switching mechanism, of the switching-on catch, of the switching-off catch and of the energy store is known, for example from DE 100 10 727 C2 and DE 101 20 783 C1.

The switching-off catch for initiating a switching-off process remains activated at least until the circuit breaker has been moved to the removal position and the crank is removed. However, the known circuit breakers according to the prior art have the disadvantage that the switching-on catch for initiating a switching-on process remains in an activated state even after the spring store has been unloaded. Thus, it is not possible to carry out a functional test on the circuit breaker even after removal, without resetting the store unloading by operating the movement drive once again. However, this is undesirable since it would contravene the principles of safety at work.

SUMMARY OF THE INVENTION

One object of an embodiment of the present invention is to specify a low-voltage circuit breaker in which the switching-on catch for initiating a switching-on process is automatically moved to a deactivated state once a store has been unloaded. A further object of an embodiment of the invention is to specify a low-voltage circuit breaker, whose mechanism for automatic deactivation of the switching-on catch while the circuit breaker is being removed after the store has been unloaded costs little and is not susceptible to defects.

One particular advantage of the circuit breaker according to an embodiment of the invention is that the store unloading mechanism is not only activated once at a defined point during the removal process (unloading position), but is automatically reset as the removal process continues thus allowing mechanical testing of the switch by maintenance personnel without any additional effort. Furthermore, an embodiment of the invention provides that, when the low-voltage circuit breaker is once again inserted into the switchgear assembly and is moved to the operating position, the store unloading mechanism is automatically reset to its original state, without the store being unloaded once again during the insertion process. This ensures that, according to an embodiment of the invention, whenever the low-voltage circuit breaker is removed once again, the energy store is unloaded in accordance with the ANSI standard, and the switching-on catch is then moved to a deactivated state.

For this purpose, at least one power-transmitting system, which is connected to the insertion shaft, can be connected to the switching-on catch such that the switching-on catch can be moved to an activated state from a deactivated state at a defined unloading position of the movement, and can be moved to a deactivated state from an activated state at a defined reset position in the movement. In one preferred embodiment variant, the power-transmitting system has a three-part linkage which is connected via a lever arm (which is mounted such that it can rotate) to a variable-length tensioning element with the variable-length tensioning element being connected to the insertion shaft.

In this way, an embodiment of the invention provides an automatic resetting function for the store unloading mechanism. This allows the low-voltage circuit breaker to be operated intuitively by the maintenance personnel. Furthermore the store unloading which is required by the ANSI Standard is carried out during the removal of the circuit breaker.

The variable-length tensioning element which is connected to the insertion shaft and is preferably a cable, converts the angle position of the insertion shaft to a thrusting movement of a three-part linkage by way of a lever arm which is mounted such that it can rotate. The thrusting movement of the three-part linkage moves a driver, whose lever rotates the lever of a switching-on half-shaft. The rotation of the switching-on half-shaft activates the switching-on catch. In the process, the abovementioned power transmitting elements are arranged such that the thrusting movement of the three-part linkage leads to activation of the switching-on catch at a predefined unloading position of the insertion shaft. Since the switching-off catch is likewise activated by virtue of its design during the movement, low-load switching is initiated, which leads to unloading of the spring store in accordance with the ANSI standard without the main contacts being closed.

In one particularly preferred embodiment variant, the central link of the three-part linkage is in the form of a bending link. Once the switching-on catch has been operated in the unloading position of the low-voltage circuit breaker, the fact that at least one link of the linkage is moved out of the guide on reaching the unloading position device that the bending link is moved from an essentially vertical position to an essentially horizontal position. The bending of the three-part linkage which occurs during this process rotates the lever of the switching-on half-shaft via the driver once again to a position such that the switching-on catch is moved to a deactivated state. Once the circuit breaker has been removed, this makes it possible for the maintenance personnel to carry out a functional test on the circuit breaker without having to reset the store unload by operating the movement drive again.

BRIEF DESCRIPTION OF THE DRAWINGS

The present invention will become more fully understood from the detailed description of preferred exemplary embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
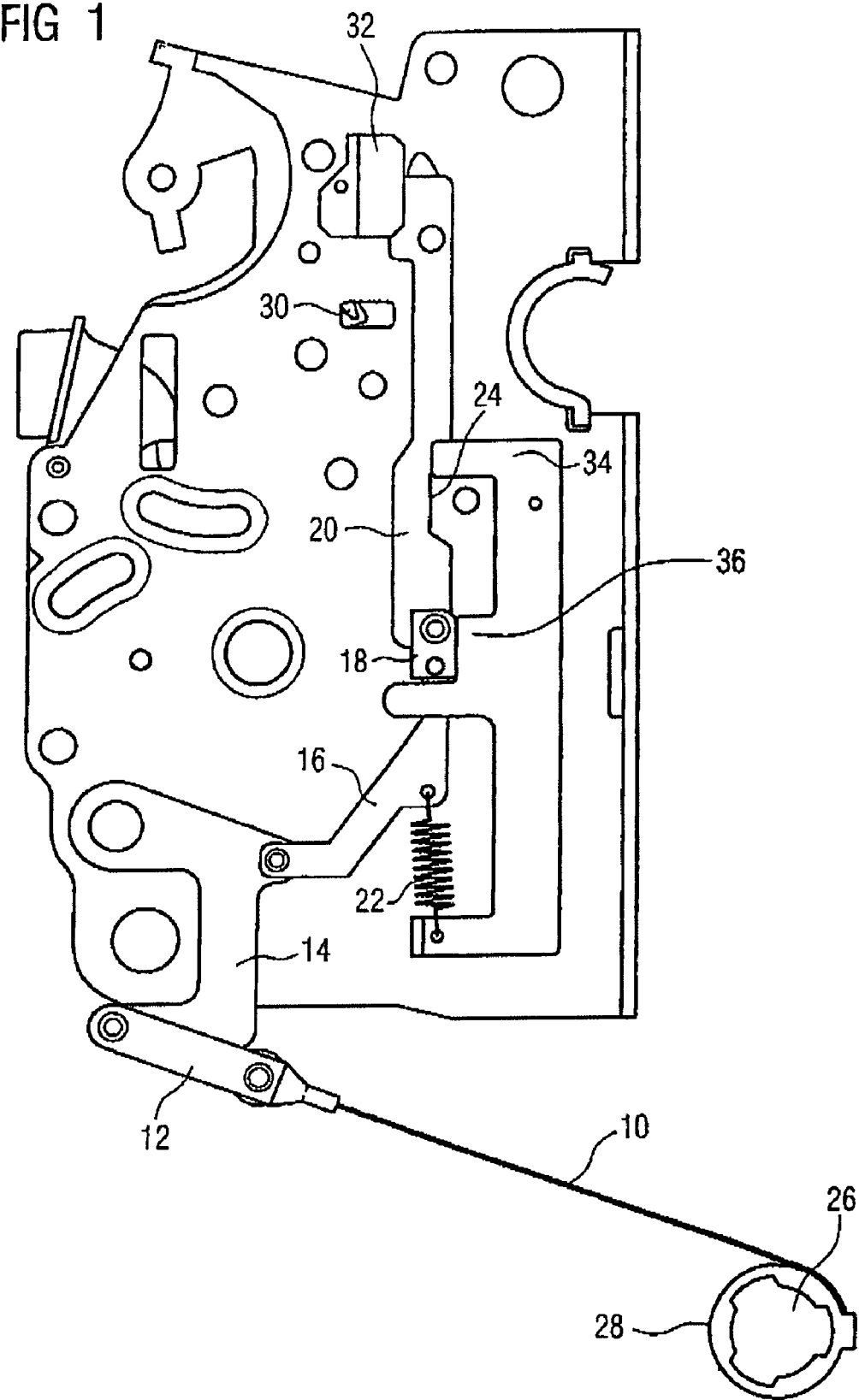
FIG. 1 shows a store unloading mechanism according to an embodiment of the invention, illustrated schematically, for a low-voltage circuit breaker in the operating position.

FIG. 1 shows a store unloading mechanism for a low-voltage circuit breaker according to the invention in its operating position. According to the ANSI Standard, the energy store which is generally a spring store (not illustrated here) must be unloaded, for safety at work reasons, during the removal of a low-voltage circuit breaker. The store unloading mechanism is used for this purpose, resulting in the switching-on catch 44 (FIGS. 6 and 7) being activated at a predefined unloading position during the movement of the low-voltage circuit breaker. This activation of the switching-on catch 44 initiates low-load switching, during which the spring store is unloaded without the main contacts (not illustrated here) being closed, since the switching-on catch 44 of the low-voltage circuit breaker is likewise activated, by virtue of its design, during the movement.

When the circuit breaker is in the operating position as shown in FIG. 1, no force is yet exerted on the lever arm 14 via the variable-length tensioning element 10, which is connected to the insertion shaft 26. The variable-length tensioning element 10 is at least partially wound up on the insertion shaft 26 via a coil former 28, and is articulated on the lever arm 14 via a lug 12. The lever arm 14 which is mounted such that it can rotate, is connected to the three-part linkage (including the links 16, 18 and 20).

In this case, the linkage links 16 and 20 form the outer links, and the bending link 18 forms the intermediate link in the three-part linkage. The movement of the circuit breaker from the operating position (as shown in FIG. 1) results in a rotary movement of the insertion shaft 26 acting on the lever arm 14 via a tensioning force, which is transmitted by the variable-length tensioning element 10.

Figure 2:
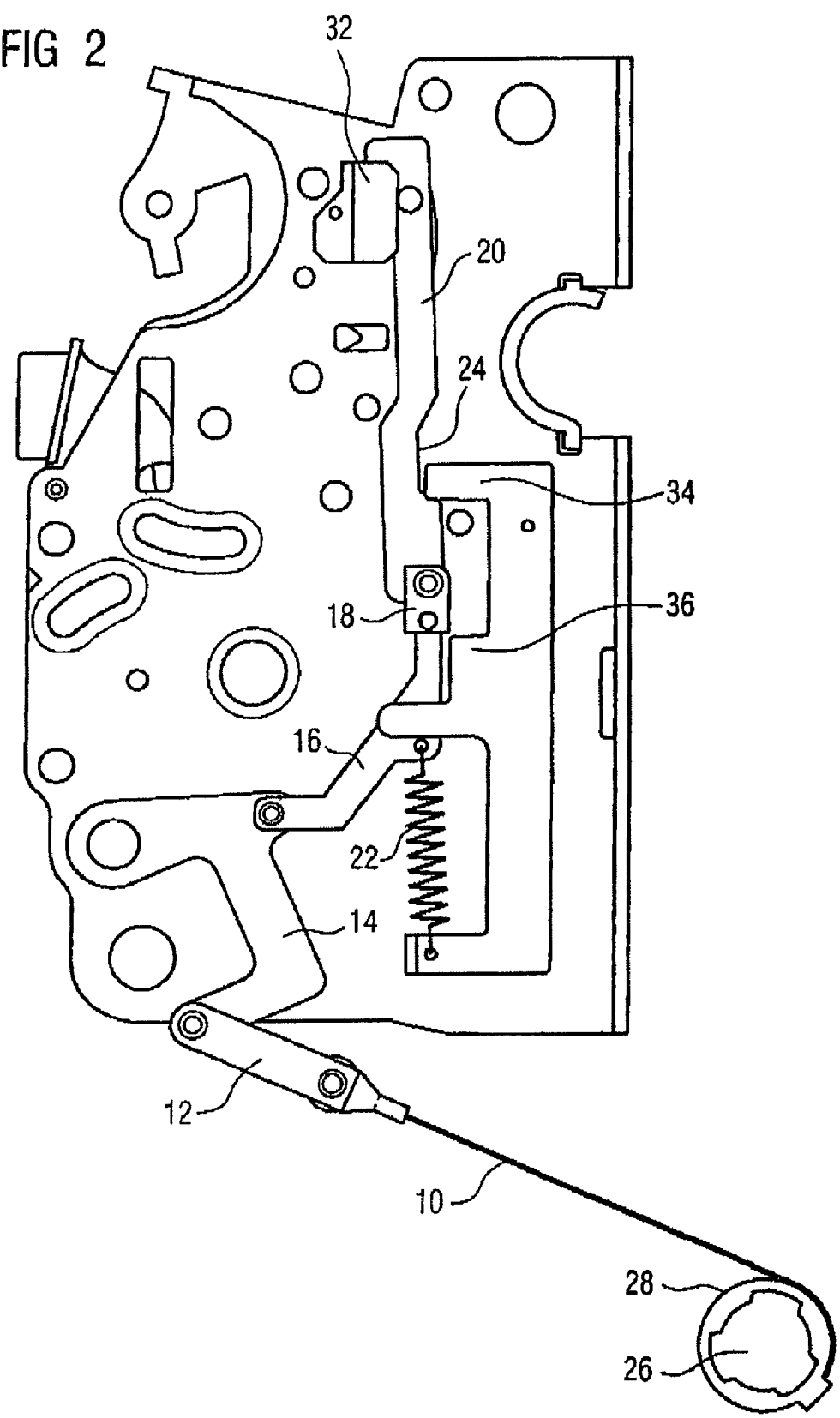
FIG. 2 shows a store unloading mechanism according to an embodiment of the invention, illustrated schematically, for a low-voltage circuit breaker in the unloading position.
Figure 4:
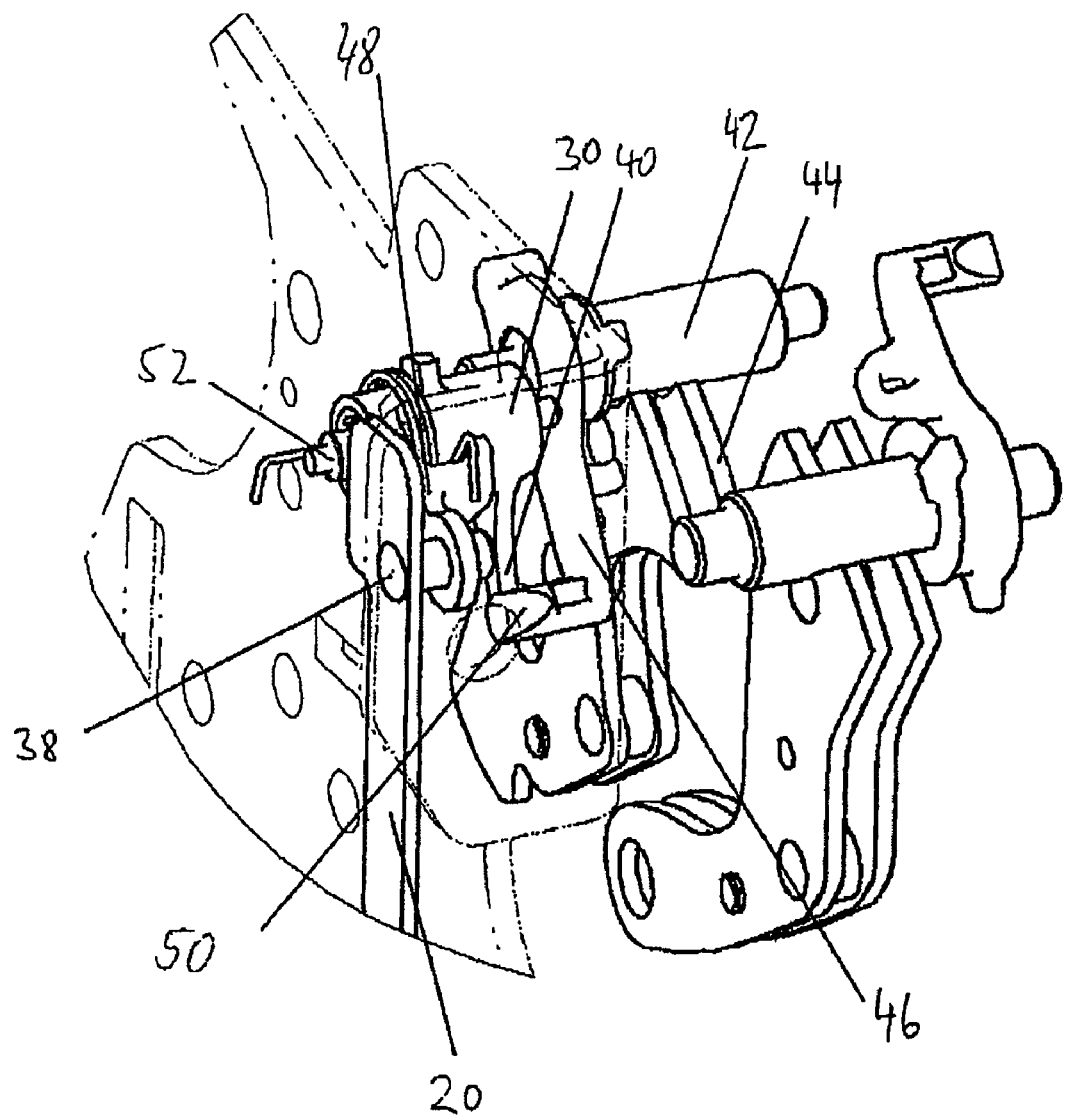
FIG. 4 shows the mechanical coupling of the three-part linkage to the (deactivated) switching-on catch of the low-voltage circuit breaker, illustrated in perspective form.
Figure 5:
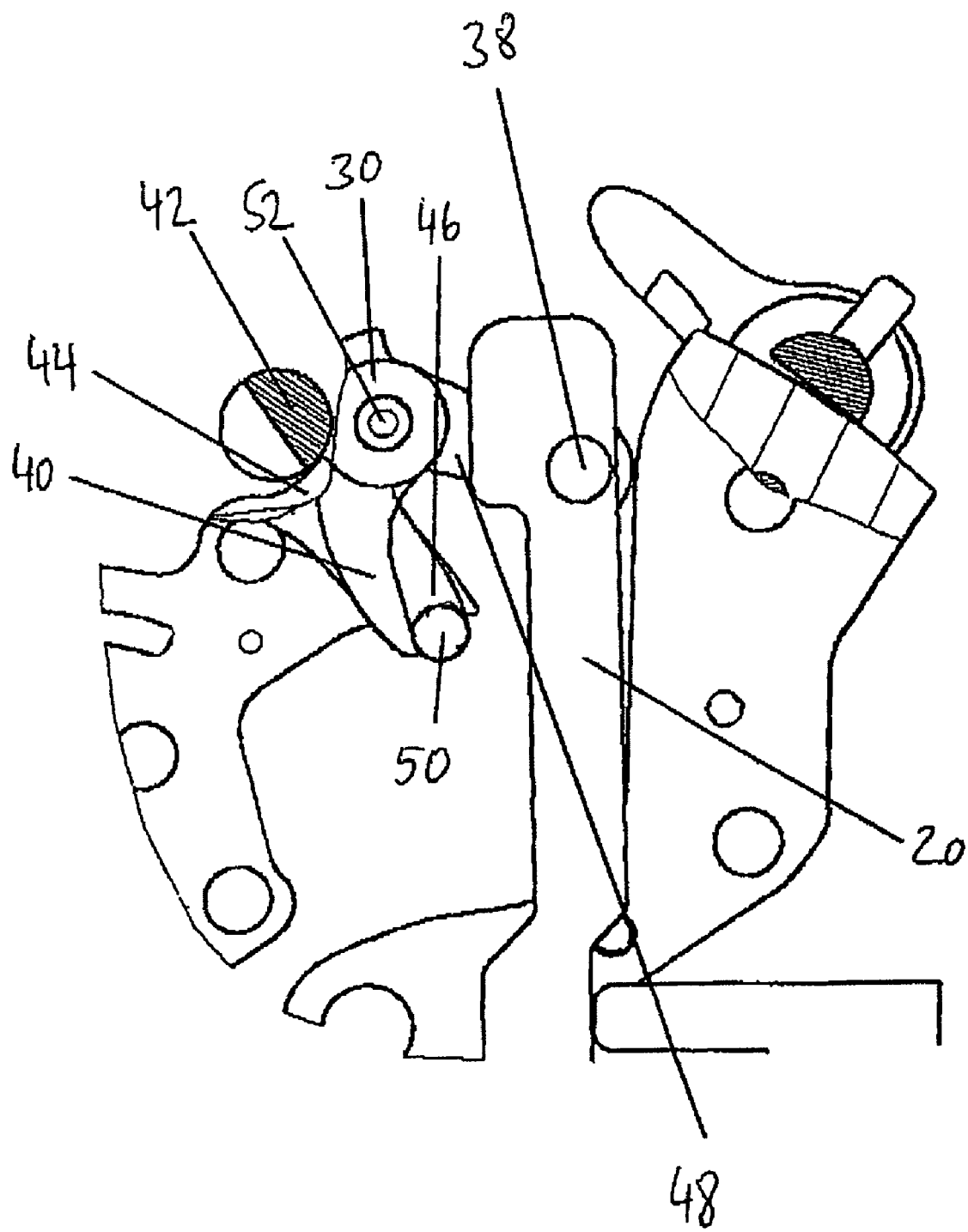
FIG. 5 shows the mechanical coupling of the three-part linkage to the (deactivated) switching-on catch of the low-voltage circuit breaker, illustrated in the form of a section.
Figure 6:
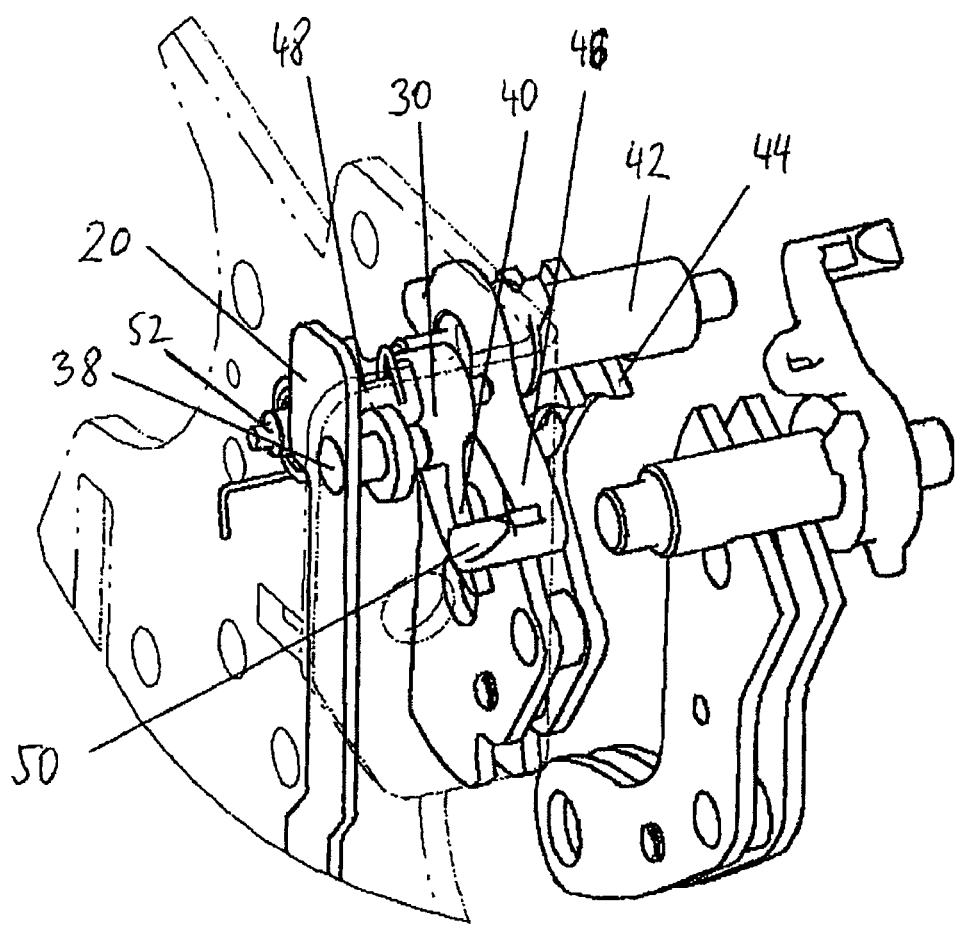
FIG. 6 shows the mechanical coupling of the three-part linkage to the (activated) switching-on catch of the low-voltage circuit breaker, illustrated in perspective form.
Figure 7:
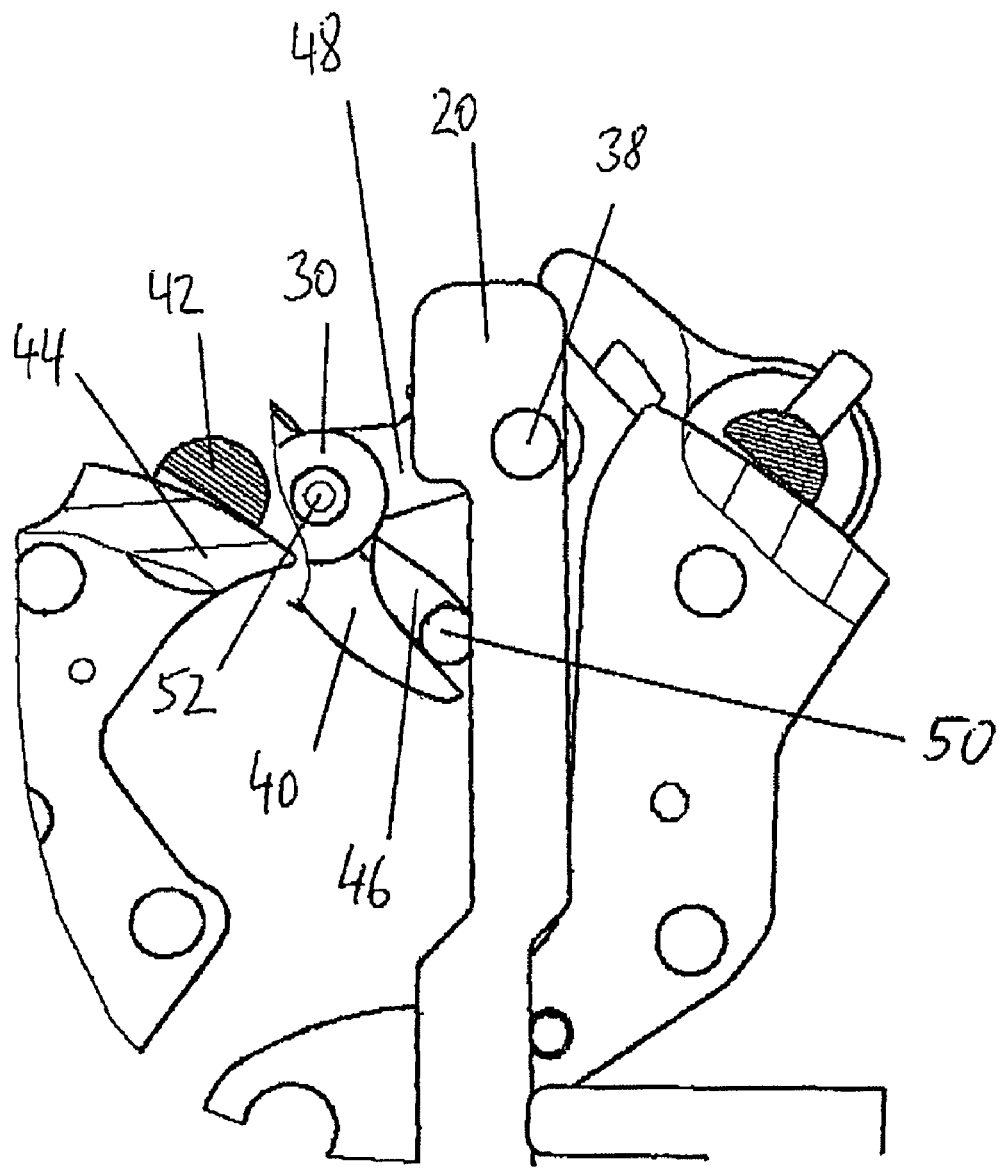
FIG. 7 shows the mechanical coupling of the three-part linkage to the (activated) switching-on catch of the low-voltage circuit breaker, illustrated in the form of a section.

As a result of this, the three-part linkage (including the links 16, 18 and 20) will carry out an upward-thrusting movement. This moves the driver 30 in such a way that it rotates a lever 46 on the switching-on half-shaft 42. The rotation of the switching-on half-shaft 42 leads, on reaching the unloading position (as shown in FIG. 2), to movement of the switching-on catch 44 from a deactivated state (FIGS. 4 and 5) to an activated state (FIGS. 6 and 7).

Prior to this movement of the three-part linkage (including the links 16, 18 and 20) the upper linkage link 20 was locked both by the plate 32 and by the plate 34. The unloading of the energy store as required in accordance with the ANSI Standard is achieved by activation of the switching-on catch 44. As can be seen in FIG. 2, the guide 24 is arranged such that the plate 34 reaches the lower end of the guide 24 when the circuit breaker is in the unloading position. Further movement of the circuit breaker out of its withdrawable frame now results in the upper linkage link 20 being forced sideways, as it is guided 24 by the plate 34, by further upward movements of the linkage, including the links 16, 18 and 20.

Figure 3:
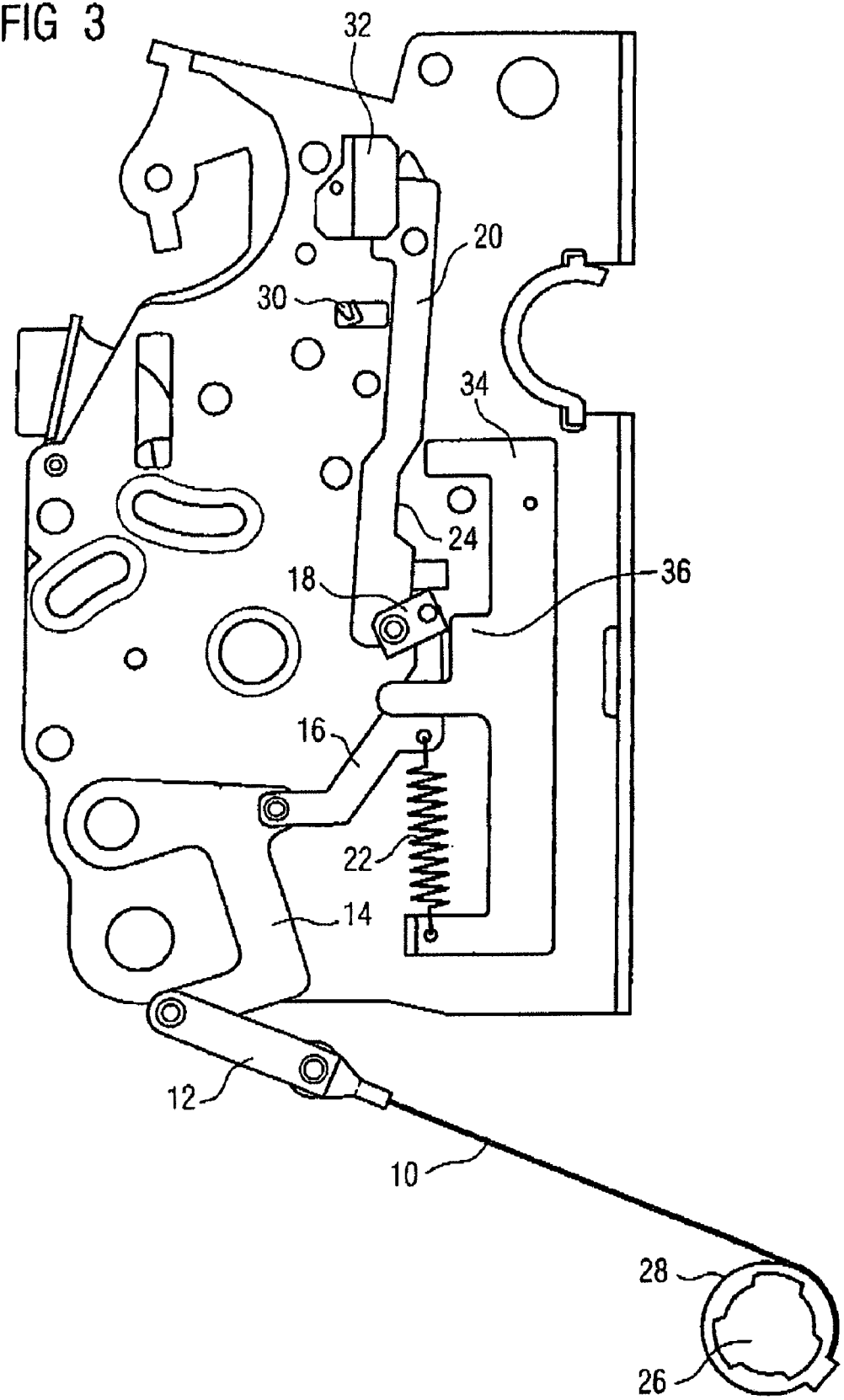
FIG. 3 shows a store unloading mechanism according to an embodiment of the invention, illustrated schematically, for a low-voltage circuit breaker in the removal position.

The upper linkage link 20 is moved sideways by the interaction of the sideways movement of the upper linkage link 20 as a result of it being forced out (by the guide 24 and the plate 34) and the locking of the upper linkage link 20 on the plate 32. The bending link 18, which until now has been arranged essentially vertically, is bent sideways on the one hand by the sideways movement of the linkage link 20 and on the other hand during the simultaneous upward movement of the bending link 18 at the moment at which a step 36 is reached, with the lateral guidance on the plate 34 being lost. The bending link 18 is thus moved into an essentially horizontal position—as illustrated in FIG. 3. This once again releases the driver 30 from the upper linkage link 20 as a consequence of which the lever 46 on the switching-on half-shaft 42 is rotated to its original position (corresponding to the operating position of the circuit breaker).

In consequence, the switching-on catch 44 is moved from the activated state to the deactivated state, thus allowing the circuit breaker to be functionally tested on a work bench without having to operate the movement drive once again. The spring element 22 moves the store unloading mechanism (as described above) back to the original position (illustrated in FIG. 1) again during the insertion of the circuit breaker.

FIGS. 4 to 7 show one preferred exemplary embodiment for the coupling of the linkage (16, 18, 20) and the switching-on catch 44 when the storage spring unloading is deactivated (FIGS. 4 and 5) and when the storage spring unloaded is activated (FIGS. 6 and 7). The upper linkage link 20 is connected to the driver 30 via the rotation shaft 38 such that it can rotate. The driver 30 has a connecting link 48 as well as a lever 40 and, furthermore, is mounted such that it can rotate about the rotation shaft 52.

In the deactivated state, the upper linkage link 20 and the driver 30 are in a lower end position. In this case, the lever 40 of the driver 30 does not touch the lever 46 of the switching-on half-shaft 42 via the cam 50 or touches it only slightly, so that the switching-on half-shaft 42 is in an angular position in which the switching-on catch 44, which is pressed against the switching-on half-shaft 42 by the spring forces, is blocked (FIGS. 5 and 6).

Upwards movement of the linkage link 20 results, via the connecting link 48, in the lever 40 being rotated, with the lever 40 acting on the lever 46 via the cam 50, as a result of which the switching-on half-shaft 42 is moved to an angular position in which the switching-on catch 44 can move past the switching-on half-shaft 42, that is to say it is activated. This unloads the storage spring (energy store). In this case the upper linkage link 20 and the driver 30 are in a lower end position.

LIST OF REFERENCE SYMBOLS

10 Variable-length tensioning element
12 Lug
14 Lever arm
16 Linkage link
18 Bending link
20 Linkage link
22 Spring element
24 Guide
26 Insertion shaft
28 Coil former
30 Driver
32 Plate
34 Plate
36 Step
38 Shaft
40 Lever
42 Switching-on half-shaft
44 Switching-on catch
46 Lever of the switching-on half-shaft
48 Connecting link
50 Cam
52 Rotation shaft of the driver Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A low-voltage circuit breaker, comprising:
at least one switching-on catch for initiating a switching-on process;
at least one insertion mechanism, including an insertion shaft, for at least one of insertion of the circuit breaker into a withdrawable frame and removal of the circuit breaker from the withdrawable frame; and
at least one power-transmitting system, connected to the insertion shaft, connectable to the switching-on catch such that the switching-on catch is movable to an activated state from a deactivated state at a defined unloading position of the movement, and is movable to the deactivated state from the activated state at a defined reset position in the movement, wherein
the power-transmitting system includes a three-part linkage connected via a lever arm to a variable-length tensioning element, and wherein the variable-length tensioning element is connected to the insertion shaft.

2. The low-voltage circuit breaker as claimed in claim 1, wherein the variable-length tensioning element is articulated on the lever arm by way of a lug, mounted so as to be rotatable.

3. The low-voltage circuit breaker as claimed in claim 2, wherein the variable-length tensioning element is a cable.

4. The low-voltage circuit breaker as claimed in claim 2, wherein the power-transmitting system includes a driver, movable via the linkage from an activation position to a deactivation position and from the deactivation position to the activation position.

5. The low-voltage circuit breaker as claimed in claim 4, wherein the driver includes a connecting link and a lever, the connecting link being connected via a rotation shaft to a first part of the three-part linkage so as to be rotatable, and the lever being movable from an activation position to a deactivation position and from the deactivation position to the activation position, by application of force to the first part of the three-part linkage.

6. The low-voltage circuit breaker as claimed in claim 5, wherein the driver is mounted so as to be rotatable about the rotation shaft.

7. The low-voltage circuit breaker as claimed in claim 1, wherein the variable-length tensioning element is a cable.

8. The low-voltage circuit breaker as claimed in claim 7, wherein the variable-length tensioning element is articulated on the lever arm by way of a lug, mounted so as to be rotatable.

9. The low-voltage circuit breaker as claimed in claim 1, wherein the three-part linkage is connected to the lever arm, mounted so as to be rotatable.

10. The low-voltage circuit breaker as claimed in claim 1, wherein the three-part linkage includes a bending link a first outer link and a second outer link, the bending link forming a central link of the three-part linkage and being connected to the first and second outer links so as to be rotatable.

11. The low-voltage circuit breaker as claimed in claim 10, wherein the second outer link includes a guide.

12. The low-voltage circuit breaker as claimed in claim 11, wherein, during the movement of the circuit breaker from an operating position to the unloading position, the bending link is bent by a lateral movement of the second outer link along the guide and after reaching a step on the plate.

13. The low-voltage circuit breaker as claimed in claim 10, wherein the first outer link is connected to a spring element and arranged such that the bending link is held in an essentially vertical position by way of a guide for the second outer link and the plates.

14. The low-voltage circuit breaker as claimed in claim 13, wherein, during movement of the circuit breaker from an operating position to the unloading position, the bending link is bent by a lateral movement of the second outer link along the guide and after reaching a step on the plate.

15. The low-voltage circuit breaker as claimed in 10, wherein the bending link is connected to a spring element and is arranged such that the bending link is held in an essentially horizontal position after reaching the unloading position of the circuit breaker by way of a guide for the second outer link and the plates.

16. The low-voltage circuit breaker as claimed in claim 1, wherein the power-transmitting system includes a driver, movable via the three-part linkage from an activation position to a deactivation position and from the deactivation position to the activation position.

17. The low-voltage circuit breaker as claimed in claim 16, wherein the driver includes a connecting link and a lever, the connecting link being connected via a rotation shaft to a first part of the three-part linkage so as to be rotatable, and the lever being movable from an activation position to a deactivation position and from the deactivation position to the activation position, by application of force to the first part of the three-part linkage.

18. The low-voltage circuit breaker as claimed in claim 17, wherein the driver is mounted so as to be rotatable about the rotation shaft.

19. The low-voltage circuit breaker as claimed in claim 18, wherein the switching-on half-shaft is arranged in relation to the switching-on catch such that the switching-on catch is movable by rotation of the switching-on half-shaft from an activated state to a deactivated state, and from the deactivated state to the activated state.

20. The low-voltage circuit breaker as claimed in claim 18, wherein a first lever is arranged such that a cam of a second lever of a switching-on half-shaft is actable on by the first lever, and the switching on half-shaft is movable by way of the first lever from an activated state to a deactivated state, and from the deactivated state to the activated state.

21. The low-voltage circuit breaker as claimed in claim 17, wherein a first lever is arranged such that a cam of a second lever of a switching-on half-shaft is actable on by the first lever, and the switching on half-shaft is movable by way of the first lever from an activated state to a deactivated state, and from the deactivated state to the activated state.

22. The low-voltage circuit breaker as claimed in claim 21, wherein the switching-on half-shaft is arranged in relation to the switching-on catch such that the switching-on catch is movable by rotation of the switching-on half-shaft from an activated state to a deactivated state, and from the deactivated state to the activated state.

23. The low-voltage circuit breaker as claimed in claim 1, wherein the insertion shaft includes a coil former for winding up the variable length tensioning element.

24. A low-voltage circuit breaker, comprising:
first means for initiating a switching-on process;
second means, including an insertion shaft, for at least one of insertion of the circuit breaker into a withdrawable frame and removal of the circuit breaker from the withdrawable frame; and
third means, connected to the insertion shaft, for moving the first means to an activated state from a deactivated state at a defined unloading position of the movement, and for moving the first means to a deactivated state from an activated state at a defined reset position in the movement, wherein
the third means includes a three-part linkage connected via a lever arm to a variable-length tensioning element, and wherein the variable-length tensioning element is connected to the insertion shaft.

25. The low-voltage circuit breaker as claimed in claim 24, wherein the variable-length tensioning element is articulated on the lever arm by way of a lug, mounted so as to be rotatable.

26. The low-voltage circuit breaker as claimed in claim 24, wherein the variable-length tensioning element is a cable.

27. The low-voltage circuit breaker as claimed in claim 24, wherein the three-part linkage is connected to the lever arm, mounted so as to be rotatable.

28. The low-voltage circuit breaker as claimed in claim 24, wherein the three-part linkage includes a bending link, a first outer link and a second outer link, the bending link forming a central link of the three-part linkage and being connected to the first and second outer links so as to be rotatable.

29. The low-voltage circuit breaker as claimed in claim 28, wherein the second outer link includes a guide.

* * * * *